No. 828,659. PATENTED AUG. 14, 1906.
J. HUTCHINGS.
APPARATUS FOR GENERATING MOTIVE POWER FROM THE MOVEMENTS OF TIDES, WAVES, AND THE LIKE MOVEMENTS OF WATER.
APPLICATION FILED DEC. 4, 1905.

Witnesses:

Inventor
John Hutchings

FIG. 4.

No. 828,659. PATENTED AUG. 14, 1906.
J. HUTCHINGS.
APPARATUS FOR GENERATING MOTIVE POWER FROM THE MOVEMENTS
OF TIDES, WAVES, AND THE LIKE MOVEMENTS OF WATER.
APPLICATION FILED DEC. 4, 1905.

No. 828,659. PATENTED AUG. 14, 1906.
J. HUTCHINGS.
APPARATUS FOR GENERATING MOTIVE POWER FROM THE MOVEMENTS
OF TIDES, WAVES, AND THE LIKE MOVEMENTS OF WATER.
APPLICATION FILED DEC. 4, 1905.

Witnesses: Inventor
John Hutchings

Atty

No. 828,659. PATENTED AUG. 14, 1906.
J. HUTCHINGS.
APPARATUS FOR GENERATING MOTIVE POWER FROM THE MOVEMENTS
OF TIDES, WAVES, AND THE LIKE MOVEMENTS OF WATER.
APPLICATION FILED DEC. 4, 1905.

Witnesses

Inventor
John Hutchings

UNITED STATES PATENT OFFICE.

JOHN HUTCHINGS, OF LONDON, ENGLAND.

APPARATUS FOR GENERATING MOTIVE POWER FROM THE MOVEMENTS OF TIDES, WAVES, AND THE LIKE MOVEMENTS OF WATER.

No. 828,659.   Specification of Letters Patent.   Patented Aug. 14, 1906.

Application filed December 4, 1905. Serial No. 290,237.

*To all whom it may concern:*

Be it known that I, JOHN HUTCHINGS, engineer, a subject of the King of Great Britain, residing at 210 Moorgate Station Chambers, Moorfields, in the city of London, England, have invented certain new and useful Improvements in Apparatus for Generating Motive Power from the Movements of Tides, Waves, or the Like Movements of Water, of which the following is a specification.

In the generation of motive power it is customary to burn fuel products or other materials, such as gases, for driving engines or other motors or machinery or the like.

By this invention I provide means for obtaining motive power wherewith to drive engines, motors, or the like from the movements of tides or waves in the ocean acting on floating bodies either affixed to the bed or the bottom of the sea or other waters, or held by a line from the sea coast or shore while floating on the surface of same, or quite free in the open sea, in inland seas, river estuaries, or tidal rivers, or lakes.

In the accompanying drawings, illustrating this invention.

The apparatus for effecting these objects mainly consists of four tubular columns I I, bored into the bottom or the like by means of their diamond-fitted crown boring-heads at H, a submerged surrounding foundation-tank at G for holding concrete or other like material when necessary as a foundation-support, brace-frame J, anchor ropes or rods or the like at R, anchor-bars $R^2$, anchor-fittings S, anchor-buoys T, combined power-buoy and water-tank Q, pendulous cylinders W and their cradles Y, gimbal-rings X, cantalivers $u$, guide-collars $b$, guide-frames $c$, piston-rods V, a suspended house inclosing a power-room with floor and roof framing, held and regulated to its position by chain P or other like attachment and carrying a toothed rack and Archimedean worm $a$, bevel-geared pinions $t$ and their respective horizontal and vertical shafts $q^3$ and $q^4$, a shaft $q^2$, spur-wheels $r$ and $s$, pipes L and $l$, receiver K, receiver-pipes $m$, turbines $n$ and $q$, dynamo $p$, platform M, head-gear N $N^2$ and $d^4$, and the bracing-girders with their fittings O.

To commence the generation of power after the above apparatus has been completely erected, the combined buoy Q and its water-compartment $Q^6$ are lowered into the water and ultimately sunk to the required depth in the manner hereinafter described to the position shown in Figs. 2, 3, and 7, which, taking, for example, the rise and fall of the tides at London Bridge, the line $n^3$, which would represent the adjusted position at highest spring tide of the dividing-line of plate $Q^7$, Figs. 2, 3, and 7, between the air-buoy Q and its water-compartment $Q^6$. In other words the plate-line $Q^7$ would be adjusted to be on a level with the water-line $n^3$, supposing the operation to be performed during the highest spring tide which the line $n^3$ represents the level of.

Figure 1:
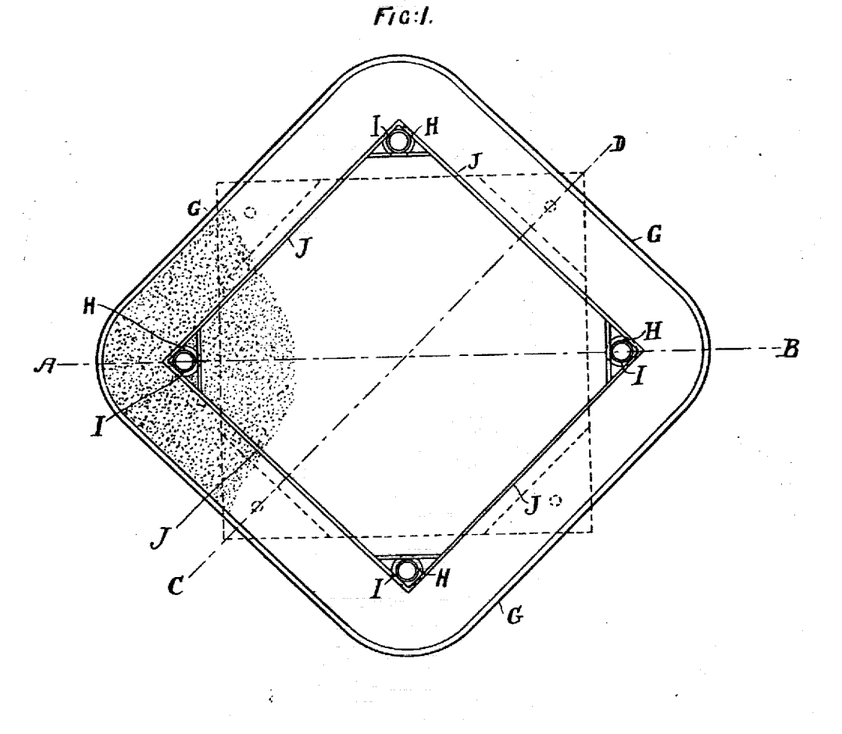
Figure 1 is a plan of the foundation of the apparatus.
Figure 2:
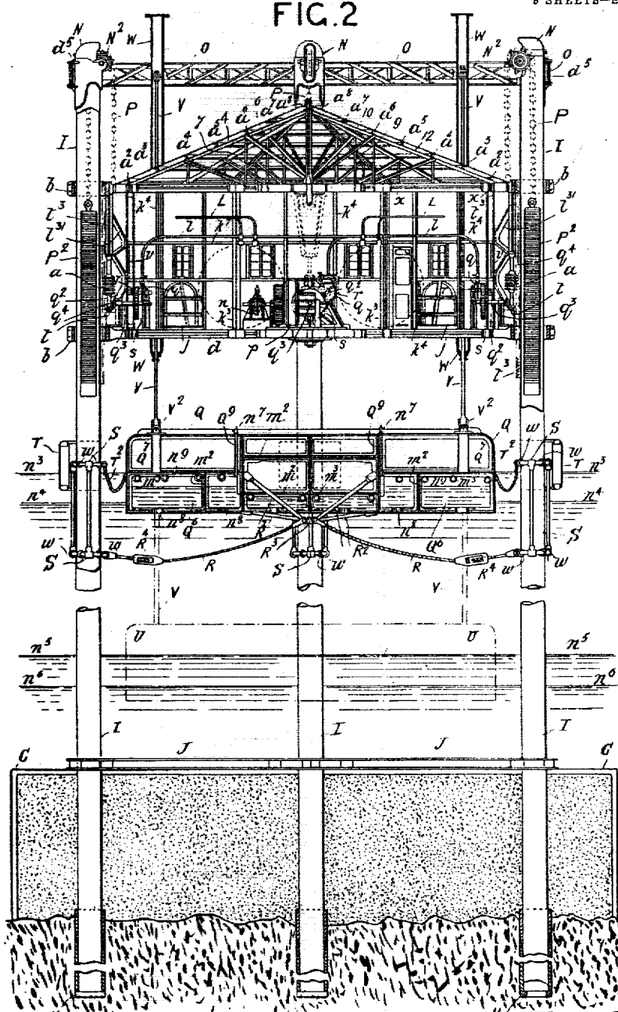
Fig. 2 is a sectional elevation on the line A B of Figs. 1, 5, 6, 8, and 9.

The line $n^4$ represents high neap tides, the line $n^5$ low neap tides, and the line $n^6$ represents lowest spring tides, Fig. 2.

When launched into the water, both the air-buoy Q and the water-tank compartment $Q^6$ may contain air.

To obtain an equality of pressure in the cylinders W W, it is necessary that the falling weight of the moving parts, consisting of the piston-rods V V, the material forming the combined buoy Q, and its water-compartment $Q^6$, the weight of the anchor-rods R, the anchor-ropes or the like at R, and the weight of the water in the water-compartment $Q^6$, should combined be equal to the buoyancy caused by the air confined in the air-buoy Q. This is necessary if an equality of pressure is to be obtained in the cylinders W W in both the upward and downward movements of the piston-rods V V. To effect this adjustment of the balance of pressure, the water-compartment $Q^6$ should contain sufficient water to cause its submersion until the dividing-plate $Q^7$ between the water-compartment $Q^6$ and the air-buoy Q is on a level with the high-water spring tides or H. W. S. T. water-line $n^3$. To effect this with minute accuracy, the pipes $Q^9$ and their valves $n^7$ (Fig. 2, sectional view, Fig. 3, elevation view) are fixed to the dividing-plate $Q^7$ and top plate of the air-buoy Q with airtight joints. These pipes $Q^9$ pass vertically through the air-buoy Q, thence are connected with the valves $n^7$.

Figure 4:
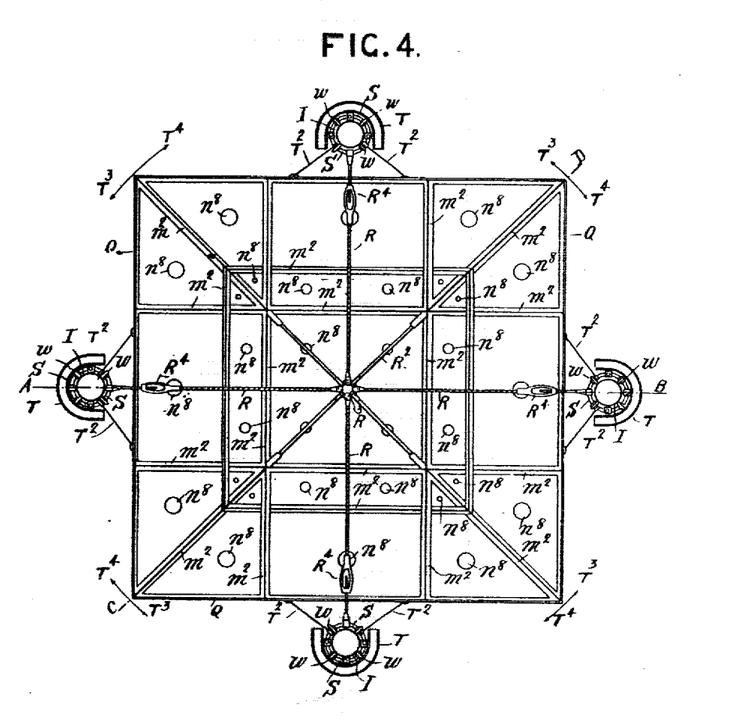
Fig. 4 is an inverted plan view of the power-buoy and also showing the means for anchoring it.
Figure 5:
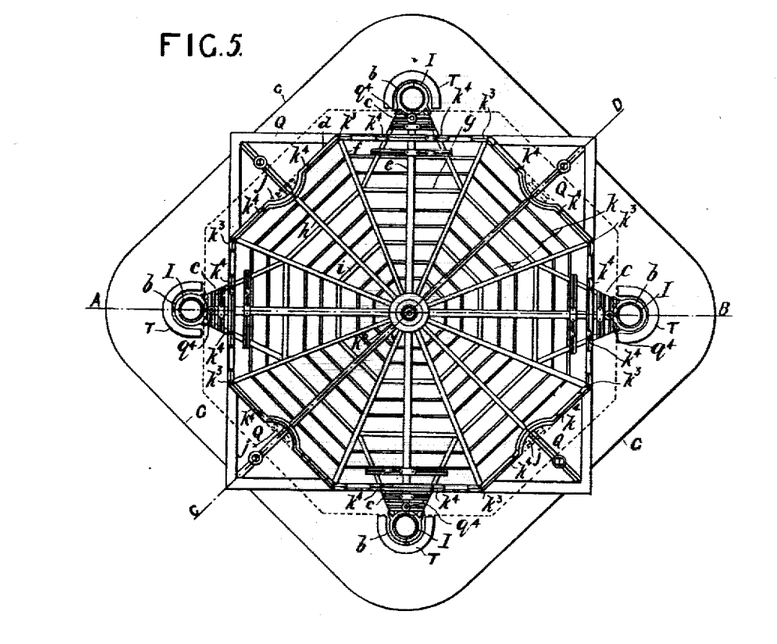
Fig. 5 is a plan of the power-house floor.
Figure 6:
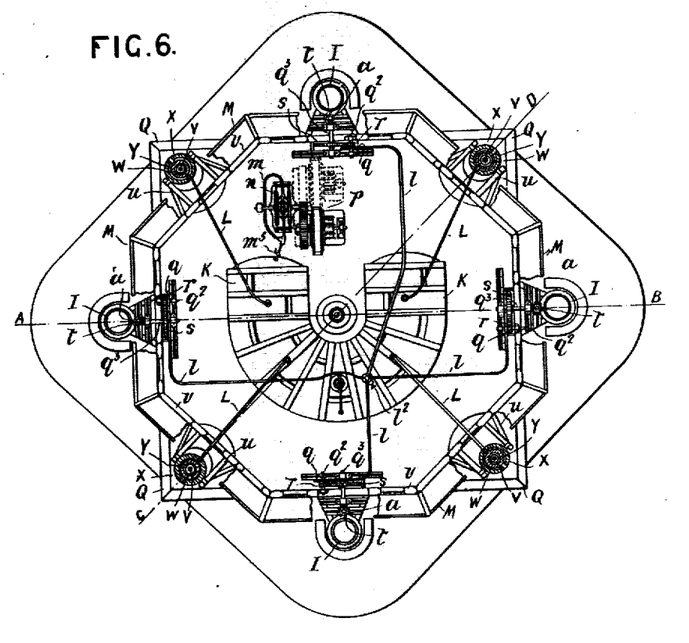
Fig. 6 is a like view showing the arrangement of the machinery on the power-house floor.

By opening the valves $n^7$ air is allowed to escape from the water-compartment $Q^6$, when water is admitted in its place through the bottom apertures $n^8$, Figs. 2 and 4, until the dividing-plate $Q^7$ is on a H. W. S. T. level with the water-line $n^3$. When the dividing-plate $Q^7$ has been sunk to the said level with the water-line $n^3$, a certain amount of air may still be in the upper portion of the water-compartment at $n^9$, Figs. 2 and 7. The buoyancy of this air will be equal to the weight of the material forming the combined buoy Q, the water-compartment $Q^6$, and the pistons and fittings resting upon the buoy at $V^2$, and, further, this material weight plus the weight of the water in the water-compartment $Q^6$ will be equal to the buoyancy obtained by the confined air in the buoy Q. Thus a pressure is obtained inside the pendulous compression-cylinder W when the buoy Q rises equal to the pressure obtained when the buoy falls through the weight of the material added to the weight of water in the water-compartment $Q^6$, and by drawing off or pumping air into the top portion of the water-compartment $n^9$ through the valves $n^7$ and the communicating-pipes $Q^9$ the equal pressure efficiency caused by the generating moving parts may be always minutely adjusted.

Figure 7:
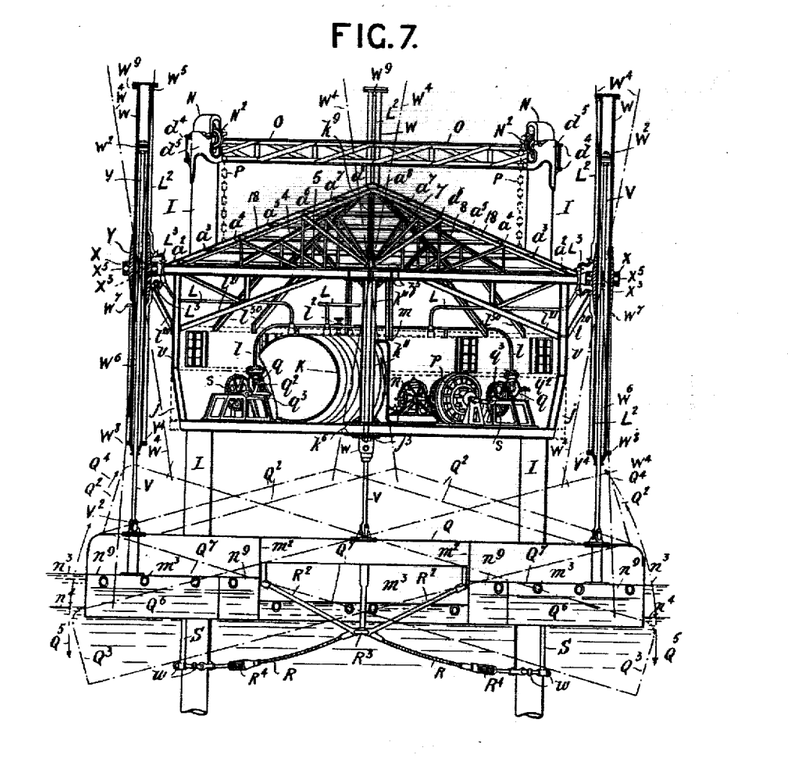
Fig. 7 is a section taken on the line C D, Figs. 1, 4, 5, 6, 8, and 9.

The air-buoy and water-compartments are divided into a number of compartments—say, for instance, twenty-two—by means of horizontal and vertical partitions, as at $m^2$ and $Q^7$, Figs. 2, 4, and 7, riveted and calked jointed. These partitions act as braces or stays, and the water-compartments between them are connected in their top air-space portions at $n^9$ by appropriate aperture-passages, as at $m^3$, Figs. 2 and 7.

The four piston-rods V V V V are connected to the buoy Q by means of universal coupling-joints, as at $V^2$, by which both the piston-rods V V and the buoy Q are enabled to move conjointly in varying angles from the horizon, both accommodating themselves automatically to any accidental position waves or tides or the like may cause the buoy Q and water-compartment to assume. Any such wave or tide movement of the water carrying the buoy Q and water-compartment $Q^6$ causes the piston-rods V V and their pistons $W^2$ to move up or down accordingly, in which event air is compressed, or water may be pumped above or below the pistons $W^2$ within the pendulous cylinders W, while they are held to resist firmly the pressure or force of the moving pistons $W^2$ by the trunnions $X^3$ $X^5$ of the gimbal-bearing rings X and the cantalivers $u$. (Shown on Figs. 3, 6, 7, 8, 9.) Such movements of the water in which the buoy Q and water-compartment $Q^6$ may be floating also causes the pendulous cylinders W to swing about the top and bottom ends, going through a horizontal circumradial area consistent with the pendulous movement in the vertical length of the cylinder W to and beyond the positions indicated by dotted lines at $W^4$ $W^4$, swinging on their gimbal-bearing trunnions at $X$ $X^5$, which are held in turn by their cantalivers $u$. Thus when the piston $W^2$ is lifted upward (by the wave or other movement of the buoy Q) sliding within the inclosing cylinders W the air contained in the cylinder W above the piston $W^2$ is compressed and forced through suitable valves $W^5$, Fig. 7, into and through the conducting-pipes $L^2$, thence through the flexible metallic or like union-tubes $L^3$ and the conducting-pipes L into the receiver K. During this upward movement of the piston $W^2$ the intake-valves at $W^5$ are automatically closed.

During the operation of lifting the piston $W^2$ air is automatically drawn into the lower portion below the piston $W^2$ in the pendulous cylinder W at $W^6$ through the pipes at $W^7$ and suitable intake-valves at $W^8$, Fig. 7. When through the falling movements of the power-buoy Q the piston-rings $W^2$ are forced or drawn downward, sliding within the inclosing cylinders W, the air contained in the cylinder W is compressed and forced through valves at $V^4$, thence up through the conducting-pipes $L^2$, the flexible metallic or like union-tubes $L^3$, the conducting-pipes L, and into the receiver K. During the time the power-buoy Q is drawing the piston $W^2$ downward the intake-valves $W^8$ are automatically closed; but meanwhile air is drawn in through the automatically-opening intake-valves $W^9$ into the cylinder W above the piston $W^2$. (Shown in Figs. 6 and 7.) While the power-buoy Q is thus being moved by the water in which it may be floating it is anchored and held in a movable working position by the anchor connections to the holding-ring $R^3$, Figs. 2, 4, and 7, fixed to the anchor-bars $R^2$. The tension of the ropes or rods R or the like connections may be regulated and governed by the swivel-shackle and screws at $R^4$, which may be screwed to tighten or loosen the connections. These anchor-rods R or the like are attached to and held into working position by the anchor-buoy T, which is made with riveted and calked joints, thus confining the air inclosed, and thereby effecting a buoyancy sufficiently strong to enable the buoy to ride or float over waves or tides and to carry the suspended holding-rods and fittings at S and R, which for the sake of buoyancy may be made of tubular material, surrounding the columns I I I I in the manner shown by the drawings.

To the hooped rod S, encircling the columns I I, are fitted to work and revolve friction-rollers at $w$ $w$, Figs. 2, 3, 4, and 7, which rollers enable the anchor-rod fittings R R⁴, suspended fittings R³, and anchor-buoys T T to move up or down as moved by waves or tides, the anchor-buoy T always carrying the fittings S and anchor-rods R or the like at a sufficient depth below the bottom of the power-buoy Q and surface of the water $n^3$ to allow of free rolling action of the buoy Q while generating power, the anchor-buoy T always floating nearly on a level with the power-buoy Q and working consistently with it, while holding the power-generating parts in their proper working positions between the tubular columns I I I I.

Figure 3:
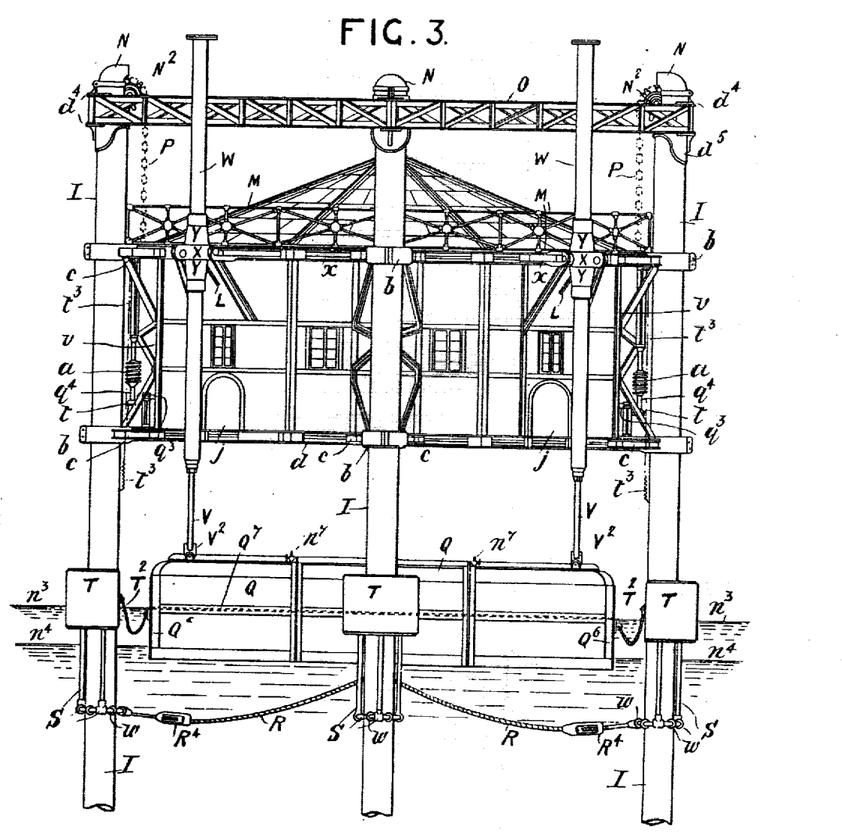
Fig. 3 is an elevation of the upper portion of the apparatus.

One end of the holding-lines T², Figs. 2, 3, and 4, is securely fastened to the power-buoy Q. The other end is fastened onto the hooped rods S, which encircle the tubular columns I. This holding-line T² is provided to hold the power-buoy Q into its working position horizontally during any uneven side or diagonally-horizontal thrust which may be produced by storm-waves against the projecting angles or corners of the power-buoy Q, causing it a tendency to revolve horizontally in either direction, (indicated by the arrow-points T³ T⁴.)

From the receiver K the stored compressed air may be drawn off to be utilized as motive power, and in connection with this apparatus it may be used, as hereinafter described, for lifting or lowering the power-house, driving electric dynamos or other machinery or the like, or may be conducted through pipes to other points—for instance, to the seashore for use as motive power, on land for driving railways, tramways, the machinery of factories or any other machinery or the like, or electric lighting of houses, villages, towns, cities, or the like, or for use on floating bodies, boats, large ships, docks, or the like, or for lighthouses generating their own power to light, or in and about harbors, bays, estuaries, landing-piers, or for blowing a very loud fog-horn, or for liquefying air by compression, or generating Hertzian waves or other wave vibrations for wireless telegraphy.

When used for lifting or lowering the power-house, the compressed air stored in the receiver K is admitted through the stop-cock at $l^2$ into the conducting-pipes $l$, thence passing along into and working a reversible turbine or other like motor at $q$, which propels a toothed pinion $r$ on a shaft $q^2$, the teeth of which pinion engage the teeth of a spur-wheel $s$, thereby turning a horizontal shaft $q^3$, on which is fixed the bevel-geared pair of spur-wheels at $t$, and this vertical shaft $q^4$ and its fixed Archimedean worm $a$, which by engaging the teeth of a geared rack $t^3$, Figs. 2 and 3, causes the house to be lifted or lowered or held firmly at any required height or level within the range of the rack $t^3$.

As a counterbalance for the purpose of relieving the strain that would otherwise be thrust onto the lifting-gear $a$, $q$, $t$, $r$, $q^2$, $q^3$, $q^4$, and $s$ and the toothed rack $t^3$ the house is hung on weights P² by means of four strong chains or ropes or the like at P, which pass over the sprocket pulley-wheel N², thence into the tubular columns I I I I, holding the suspended weights P². Thus when the house is lifted the weight P² descends into the tubular column I, and when the house is lowered the weight ascends, rising or falling in the same proportion as the house is lifted or lowered by the geared machinery, the guide-frames $c$ and supporting-braces holding the guide-collars $b$, which are made with sufficient clearance between them and the columns I to enable the collars $b$ to slide freely up or down, while holding the power-house in its working position at any desired altitude between the columns I, as shown in drawings Figs. 2, 3, 5, 6, 8.

When the stored compressed air in the receiver K is used as a motive power for driving an electric dynamo or generating electric power, the air is admitted through the stop-cock $m^5$ (Fig. 6, plan view) into the conducting-pipes $m$, thence into a reversible air-turbine or other motor $n$, which in turn revolves or drives the dynamo $p$.

The apparatus is so arranged that the movements of the power-buoy Q and water-compartment Q⁶ during stormy weather will be all within the wide scope of movements obtained by the use of gimbal-ring and trunnion bearings at X, X³, X⁵, Fig. 7, in conjunction with the universal-joint couplings V² and the means provided for lifting and lowering the power-house, which together allow the pendulous cylinders W, the piston-rods V, the power-buoy Q, and water-compartment Q⁶ free play within the limits and allowances provided by the anchor rods or ropes R, the holding-lines T² while generating power at any angle from the horizon up to the extreme ever reached. The four supporting tubular columns at their top ends are fitted with the ferrule-caps $d^5$, bossed up on each side to form the bearings of the pulley-wheels N² and fitted with flanges, as at $d^4$, for receiving the ends of bracing-girders O O.

The suspended power-house may have an eight-sided figure, which with the roof forms a somewhat flat-sided semi-octahedron in exterior form. The lower portion of the power-house, consisting of the framing of its bottom, which carries the floor and operating machinery, is framed together by means of the iron beam $d$, which forms a bearer upon which may be erected the angle-pillars $k^3$ $k^3$ and the stud-posts $k^4$ $k^4$, Fig. 5.

The beams $d$ $v$, Fig. 7, at $j$ are shaped to permit of extreme movement, such as are produced by heavy seas on the power-buoy Q and the pendulous cylinder W while working. The beam $d$ constitutes the exterior shell or wall of the house—octagonal polygon—braced and fixed to the radiating ends of said beams and their associated beams, which are cross-braced by other beams, and thereon is laid the floor of the house. $k$ represents joists fitted between them, the whole being fixed and securely held together by top and bottom center plates at $k^6$, Figs. 5 and 7. The wall of the power-house is formed by erecting and framing together angle-pillars $k^3$ $k^3$ and suitable intermediate stud-posts $k^4$, supported by window-sill and lintel stringers $k^7$, braces, and stays. These parts are all united by suitable straps, collars, and angle-braces, or the like riveted or bolted together. The top portion of the power-house, consisting of the framing of the said tie-beams and the cantaliver-beams $u$, carrying the pendulous cylinders W, may be built together by means of suitable iron straps, braces, collars, angle-ties, or the like riveted or bolted to the top wall-plate beam $x$, which is securely fixed upon the angle-pillars $k^3$ and intermediate stud-posts $k^4$ by straps, collars, screwed bolts, rivets, or the like.

The exterior circumscribing beam $x$ is braced and securely fixed to the radiating ends of the tie-beams $y$, $z$, $z^2$, and $z^4$ and their similarly-associated or corresponding opposite beams, all of which are in turn cross-braced by the beams $y^2$ and $y^3$, the whole being held together by means of suitable straps, collars, angle-plates united by rivets or bolts to top and bottom center plates at $z^5$.

The power-house is covered by a roof trussed to the aforesaid tie-beams by means of a central king-post $k^9$, with two queen-rods and two struts on either side supporting rafters, members of the roof, (numbered 3 to 18.) The feet of these rafters 3 4 5 6 7 8 9 10 11 12 13 14 15 16 17 18, of T-iron or other suitable section, are secured on the tie-beams, while their head or top ends are securely fixed to the top of the king-post-receiving flanges $k^9$, Fig. 7. On the top side of these rafters purlins $a^2$ $a^3$ $a^4$ $a^5$ $a^6$ $a^7$ $a^8$ are securely fixed for the purpose of carrying suitable roof-covering of the power-house, Figs. 2, 7, and 9. The power-house king-bolt (shown at $k^{10}$, Fig. 7) is suspended from the roof king-post $k^9$, thence passed down through the tubular column, through the intersecting point of the floor-bearers, and center plates $k^6$. The lower end of this king rod or bolt has a screwed nut, as at $j^3$, Fig. 7, by turning which the power-house and roof are braced up securely and the structure firmly keyed together. The struts $l^{20}$ and brace-beams $l^{21}$ are fixed and braced, as shown in Fig. 7, to relieve extra strain on the cantalivers during the working of the pendulous cylinders W, while the braces $l^{30}$ $l^{30}$, Fig. 7, are provided to support the exterior guide-frames $c$ and guide-collars $b$.

Figure 8:
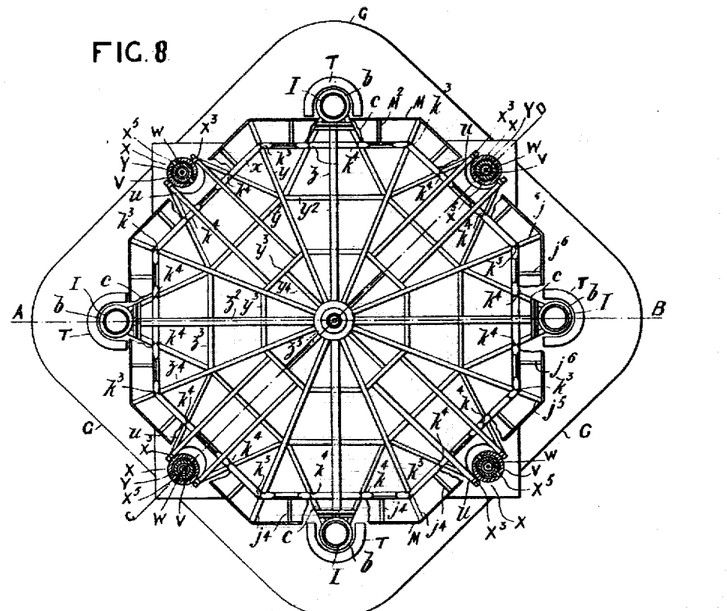
Fig. 8 is a plan showing the lateral framing of the beams of the power-house.
Figure 9:
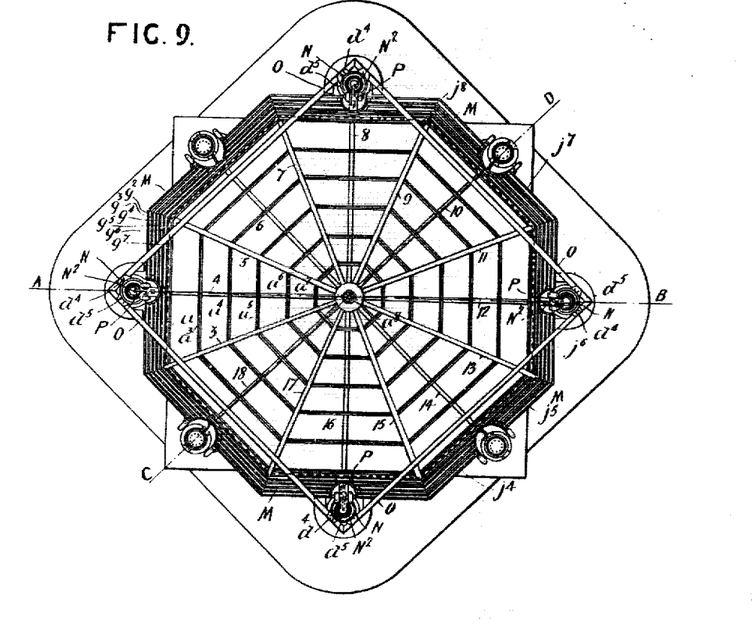
Fig. 9 is a plan illustrating the details of the roof construction and footway of the power-house.

The platform M, surrounding the power-house at its eaves-level, Figs. 9 and 8, is provided to enable attention to be paid to the exterior of the power-house and the outside moving parts of the apparatus, including the trunnions $X^3$ $X^5$ of the gimbal-bearings, the interior of the pendulous cylinders W, the pistons and rods $W^2$ and V, respectively. The platform M is borne by suitable brackets under the floor-battens at $j^4$ $j^5$ $j^6$ $j^7$ $j^8$ and $M^2$ and $M^3$, Figs. 8 and 9, at the angles of the house at $k^3$, Fig. 8, and at intervals between the cantaliver-beams $u$ and the guide-frame beams $z$ these brackets are made with pendent web-pieces having flanged heels abutting and fixed by screws to rest against the exterior vertical face of the top wall-beam $x$. The floor-battens $g^2$ $g^3$ $g^4$ $g^5$ $g^6$ $g^7$ of the platform M surround said roof and rest upon brackets $j^4$ $j^8$ and also on the top flanges of the cantaliver-beams $u$ and their braces and the guide-frames $c$ and their braces. A hand-rail is fixed around the exterior boundary of the platform M. Suitable movable stairs may be hung in working position at different points around the power-house.

Having now particularly described and ascertained the nature of my said invention and in what manner the same is to be performed, I declare that what I claim is—

1. An apparatus of the character described, comprising a fixed structure, a superstructure, counterweighted compensating means of suspension between the fixed structure and the superstructure, a buoyant member suspended from said superstructure, adjustable flexible connections between said buoyant member and said fixed structure for retaining said buoyant member in horizontal relation with respect to the fixed structure, power-generating devices carried by said superstructure, and connections between said power-generating devices and said buoyant member for operating said devices during the rising and falling of said member.

2. An apparatus of the character described, comprising a fixed structure, a superstructure, counterweighted compensating means of suspension between the fixed structure and the superstructure, a buoyant member, oscillatory cylinders carried by the superstructure, pistons operating therein and connected with the buoyant member for suspending it and adapted to be operated during the rise and fall of said buoyant member, and adjustable connections between said buoyant member and said fixed structure for retaining said member in horizontal relation with respect to the said fixed structure.

3. An apparatus of the character described, comprising a buoyant member, a fixed structure, oscillatory air-compressors adapted to suspend said member and to be operated by the said member, and a counterweighted connection between said oscillatory air-compressors and said fixed structures.

4. An apparatus of the character described, comprising a fixed supporting structure, a movable suspended superstructure, counterweighted devices therefor, and means for adjusting the relative positions of the movable suspending superstructure with respect to the fixed supporting structure.

5. An apparatus of the character described, comprising supporting means, a counterweighted movable element suspended from said means, a buoyant member, and power-generating means carried by said movable element and suspending said buoyant member, said power-generating means operated by the rise and fall of said buoyant member.

6. An apparatus of the character described, comprising fixed supports, buoys connected with said supports, a buoyant member, flexible connections between said buoyant member and said buoys, a counterweighted movable element suspended from said supports, and power-generating devices carried by said element and suspending said buoyant member, said devices operated by the rise and fall of said buoyant member.

7. An apparatus of the character described, comprising a supporting structure, means for fixing the lower portion of said structure below the water-line, a counterweighted movable superstructure suspended from said supporting structure, buoys connected with said supporting structure, power-generating devices carried by said movable superstructure, a buoyant member for operating said power-generating devices, and flexible connections between said buoyant member and said buoys.

In testimony whereof I have hereunto set my hand in presence of two subscribing witnesses.

JOHN HUTCHINGS.

Witnesses:
ALFRED GEORGE BROOKES,
JOHN COODE HOW.